US011236181B2

(12) United States Patent
Marin et al.

(10) Patent No.: US 11,236,181 B2
(45) Date of Patent: Feb. 1, 2022

(54) OLEFIN POLYMERIZATION CATALYST (71) Applicant: W.R. GRACE & CO.-CONN., Columbia, MD (US)

(72) Inventors: Vladimir P. Marin, Houston, TX (US); Ahmed Hintolay, Houston, TX (US); Neil J. O'Reilly, Seabrook, TX (US)

(73) Assignee: W.R. Grace & Co.-CONN., Columbia, MD (US)

( * ) Notice: Subject to any disclaimer, the term of this patent is extended or adjusted under 35 U.S.C. 154(b) by 0 days.

(21) Appl. No.: 16/641,347

(22) PCT Filed: Aug. 23, 2018

(86) PCT No.: PCT/US2018/047657
§ 371 (c)(1),
(2) Date: Feb. 24, 2020

(87) PCT Pub. No.: WO2019/046087
PCT Pub. Date: Mar. 7, 2019

(65) Prior Publication Data
US 2020/0247920 A1  Aug. 6, 2020

Related U.S. Application Data (60) Provisional application No. 62/551,378, filed on Aug. 29, 2017.

(51) Int. Cl.
*C08F 10/02* (2006.01)
*C08F 2/06* (2006.01)
(Continued)

(52) U.S. Cl.
CPC ............... *C08F 10/02* (2013.01); *C08F 2/06* (2013.01); *C08F 4/651* (2013.01); *C08F 4/6565* (2013.01);
(Continued)

(58) Field of Classification Search
CPC ...... C08F 4/6567; C08F 10/02; C08F 110/02; C08F 4/651; C08F 4/6565; C08F 2/06;
(Continued)

(56) References Cited

U.S. PATENT DOCUMENTS 4,547,552 A * 10/1985 Toyota ................. C08F 297/08
525/247
6,248,685 B1   6/2001 Joubert et al.
(Continued)

FOREIGN PATENT DOCUMENTS

JP         02-069504 A  *  3/1990
WO      WO-99/33843 A1      7/1999
(Continued)

OTHER PUBLICATIONS

Gupta et al., "MgCl2 6H20-based titanium catalysts for propylene polymerization," Die Angewandte Makromolekulare Chemie 213 (1993) 113-125.
(Continued)

*Primary Examiner* — William K Cheung
(74) *Attorney, Agent, or Firm* — Foley & Lardner LLP (57) ABSTRACT

A process for preparing a solid pre-catalyst component for use in olefinic polymerization includes dissolving a magnesium chloride in an alcohol and optionally adding water to form a first solution having a water content of about 0.5 mmol water per mol $MgCl_2$ to about 100 mmol water per mol $MgCl_2$; contacting the first solution with a first titanium compound to form the solid pre-catalyst component; and treating the solid pre-catalyst component with a hydrocarbon or halogenated hydrocarbon solvent, optionally containing a second titanium compound.

19 Claims, 5 Drawing Sheets (51) Int. Cl.
*C08F 4/656* (2006.01)
*C08F 110/02* (2006.01)
*C08F 4/651* (2006.01)

(52) U.S. Cl.
CPC .......... *C08F 4/6567* (2013.01); *C08F 110/02* (2013.01); *C08F 2500/12* (2013.01); *C08F 2500/18* (2013.01); *C08F 2500/24* (2013.01)

(58) Field of Classification Search
CPC .............. C08F 2500/12; C08F 2500/18; C08F 2500/24
USPC ......................................................... 526/122
See application file for complete search history.

(56) References Cited

U.S. PATENT DOCUMENTS

| | | |
|---|---|---|
| 6,825,146 B2 | 11/2004 | Kilty et al. |
| 9,598,509 B2 | 3/2017 | Collina et al. |
| 2011/0294970 A1 | 12/2011 | Chang et al. |
| 2015/0225494 A1 | 8/2015 | Evangelisti et al. |
| 2016/0102156 A1 | 4/2016 | Umezawa-Vizzini et al. |

FOREIGN PATENT DOCUMENTS

| | | |
|---|---|---|
| WO | WO-03/082930 A2 | 10/2003 |
| WO | WO-2004/054711 A1 | 7/2004 |

OTHER PUBLICATIONS

International Search Report and Written Opinion in International Application No. PCT/US2018/047657, dated Dec. 11, 2018 (11 pages).
Rahbar et al., "Effect of water on the supported Ziegler-Natta catalysts: optimization of the operating conditions by response surface methodology," Catalysis Letters, 2015, vol. 145, No. 5, pp. 1186-1195.
European Search Report on EP 18850692.7 dated Apr. 29, 2021.
Garoff et al., "The influence of crystal water on the performance of a Ziegler-Natta catalyst in propylene polymerization," Transition Metals and Organometallics as Catalysts for Olefin Polymerization, 1988, pp. 197-208.
Gupta et al., "Studies in Supported Titanium Catalyst System Using Magnesium Dichloride-Alcohol Adduct," Advances in Engineering Fluid Mechanics, Studies in Supported Titanium Catalyst System, Chapter 21, pp. 571-581.

* cited by examiner

OLEFIN POLYMERIZATION CATALYST

CROSS-REFERENCE TO RELATED APPLICATIONS

The present application is a U.S. National Phase Application under 35 U.S.C. § 371 of International Application No. PCT/US2018/047657, filed on Aug. 23, 2018, which claims the benefit of and priority to U.S. Patent Application No. 62/551,378, filed on Aug. 29, 2017, the contents of each of which are incorporated herein in their entirety.

FIELD

The present technology is generally related to polyolefin catalysts. More specifically, the technology is related to a process for the preparation of $MgCl_2$-supported olefin polymerization catalysts.

BACKGROUND

Polyolefins are a class of polymers derived from simple olefins. Known methods of making polyolefins involve the use of Ziegler-Natta polymerization catalysts. These catalysts polymerize vinyl monomers using a transition metal halide to provide a polymer with a highly isotactic stereochemical configuration.

One type of a catalyst system includes a solid pre-catalyst component, having a magnesium dihalide (generally, a magnesium chloride) on which are supported a titanium compound and an internal electron donor compound. In order to maintain the high selectivity for an isotactic polymer product, a variety of internal electron donor compounds must be added during the pre-catalyst synthesis. Prior the polymerization reaction, the oxidation state of the titanium compound is reduced in presence of an aluminum alkyl to form the catalyst.

It is generally understood that Ziegler-Natta polymerization catalysts are extremely sensitive to even small amounts of water, which a can "poison" the catalyst and reduce polymer productivity. Accordingly, most procedures to prepare the solid pre-catalyst component go to great lengths to exclude water or dry the reagents during or prior to preparation of the pre-catalyst component.

Without being bound by theory, the present inventors have found that inclusion of water during catalyst preparation acts as a promoter for the Ziegler-Natta $MgCl_2$ based catalyst to improve the catalyst activity and catalyst morphology.

SUMMARY

In one aspect, a process is provided for preparing a solid pre-catalyst component for use in olefinic polymerization, the process including dissolving a magnesium chloride in an alcohol and optionally adding water to form a first solution having a water content of about 0.5 mmol water per mol $MgCl_2$ to about 100 mmol water per mol $MgCl_2$; contacting the first solution with a first titanium compound to form the solid pre-catalyst component; and treating the solid pre-catalyst component with a hydrocarbon or halogenated hydrocarbon solvent, optionally containing a second titanium compound.

In some embodiments, the process further includes adding to the first solution a hydrocarbon, a siloxane, an aluminum alkoxide, or a mixture of any two or more thereof to form a second solution.

In some embodiments, the process further includes adding to the first solution a hydrocarbon, a siloxane, and an aluminum alkoxide to form a second solution. However, any of the above embodiments may, in some instances, be limited by the proviso that no hydrocarbons are present during the dissolving the magnesium chloride in the alcohol. In some embodiments, the proviso that no alkylaluminum compounds are present during the dissolving the magnesium chloride in the alcohol. In some embodiments, the process further includes contacting the first solution with an internal electron donor concurrently with, or subsequent to, dissolving the magnesium chloride in the alcohol. In some embodiments, contacting the first solution with the internal electron donor and contacting the first solution with the first titanium compound in the second solvent to form the solid pre-catalyst component occur simultaneously. In some embodiments, the process includes contacting the first solution with an auxiliary electron donor.

In some embodiments, the aluminum alkoxide compound is added and is aluminum methoxide, aluminum ethoxide, aluminum isopropoxide, and mixtures of any two or more thereof. In some embodiments, the first titanium compound is a titanium halide, a titanium alkoxide, or a titanium alkoxychloride. In some embodiments, the second titanium compound is a titanium halide. In some embodiments, the magnesium chloride is hydrated magnesium chloride. In any of the embodiments herein, the dissolving may also include adjusting the moisture level of the first solution by adding water to the first solution.

In some embodiments, the moisture level of the magnesium chloride solution is from about 5 $mmol H_2O/mol$ $MgCl_2$ to 50 mmol $H_2O$/mol $MgCl_2$; or from lected from the group consisting of toluene, ethyl benzene, pentane, hexane, and heptane.

In some embodiments, the siloxane is added. In some such embodiments, the siloxane may be dimethylpolysiloxane. In some embodiments, internal electron donor is a carboxylic acid, carboxylic acid anhydride, ester, ketone, or a combination of any two or more thereof. However, in many instances, the internal electron donor may not be an ether.

In another aspect, a solid pre-catalyst component may be prepared by any of the processes described herein.

In another aspect, a process of polymerizing or copolymerizing an olefin is provided, the process including contacting any one of the solid pre-catalyst components described above, with an organoaluminum activating agent and the olefin. In some embodiments, the organoaluminum activating agent is triethylaluminum, triisobutylaluminum, tri-n-octylaluminum, or a mixture of any two or more thereof. In other embodiments, the olefin is ethylene, propylene, 1-butylene, 1-methyl-1-pentene, 1-hexene, and 1-octene.

In another aspect, a catalyst system is provided for use in olefinic polymerization, the system including any of the solid pre-catalyst components above, an electron donor, and an organoaluminum compound.

In another aspect, a composition is provided that includes magnesium chloride, an alcohol, and a titanium halide, wherein the composition is a pre-catalyst solution having a water content of about 0.5 mmol water per mol $MgCl_2$ to about 100 mmol water per mol $MgCl_2$.

In another aspect, a polyolefin material prepared from a polyolefin catalyst composition includes a pre-catalyst composition including magnesium chloride, an alcohol, and a titanium halide; wherein: the pre-catalyst composition was obtained from a pre-catalyst solution having a water content of about 0.5 mmol water per mol MgCl$_2$ to about 100 mmol water per mol MgCl$_2$; the polyolefin material is polyethylene; and the polyethylene exhibits a melt flow index of less than 40.

In some embodiments, the first solution is contacted with an internal electron donor along with or subsequent to dissolving the magnesium chloride. In some embodiments, the first solution is contacted with an internal electron donor subsequent to dissolving the magnesium chloride. In further embodiments, the magnesium chloride solution with the internal electron donor and contacting the magnesium chloride solution with the first titanium compound in the second solvent to form the solid pre-catalyst component occur simultaneously.

In some embodiments, the magnesium chloride solution further comprises an aluminum alkoxide compound. In certain embodiments, the aluminum alkoxide compound is selected from the group consisting of aluminum methoxide, aluminum ethoxide, aluminum isopropoxide and mixtures thereof.

In some embodiments, the first titanium compound is a titanium halide, a titanium alkoxide, or a titanium alkoxychloride. In some embodiments, the second titanium compound is a titanium halide. In certain embodiments, the first and second titanium compounds are titanium halides. In specific embodiments, the titanium halide is TiCl$_4$.

In some embodiments of the process for preparing a solid pre-catalyst component, the magnesium chloride is a hydrate of magnesium chloride and the moisture level of the magnesium chloride solution is of about 100 to about 20,000 ppm water based on the amount of magnesium chloride (MgCl$_2$). In some embodiments, the dissolving further comprises adjusting the moisture level of the magnesium chloride solution to about 100 to about 20,000 ppm water. In certain embodiments, adjusting the moisture level of the magnesium chloride solution is effected by addition of water to the magnesium chloride solution. In specific embodiments, the moisture level of the magnesium chloride solution is from about 1,000 to about 10,000 ppm water. In further embodiments, the moisture level of the magnesium chloride solution is from about 5,000 to about 10,000 ppm water.

In some embodiments of the process for preparing a solid pre-catalyst component, the first solvent, the second solvent, and the third solvent independently comprise a hydrocarbon or halogenated hydrocarbon solvent. In some embodiments, the hydrocarbon solvent is an aromatic or aliphatic hydrocarbon. In further embodiments, the hydrocarbon solvent is selected from the group consisting of toluene, ethyl benzene, pentane, hexane, and heptane. In specific embodiments, first solvent further comprises a siloxane solvent. In further specific embodiments, the siloxane solvent is dimethylpolysiloxane. In some embodiments, the first solvent, the second solvent, and the third solvent comprise hexane.

In some embodiments of the process for preparing a solid pre-catalyst component, the dissolving a magnesium chloride in a first solvent to form a magnesium chloride solution is conducted at a temperature of from about 80° C. to about 150° C. In some embodiments, the contacting the magnesium chloride solution with a first titanium compound, optionally in a second solvent is conducted at a temperature of from about −30° C. to about 50° C. In additional or alternative embodiments, treating the solid pre-catalyst component with a third solvent with or without a second titanium compound is conducted at a temperature of from about 80° C. to about 150° C.

In some embodiments of the process for preparing a solid pre-catalyst component, the magnesium chloride solution further comprises an alcohol. In some embodiments, the magnesium chloride forms a complex with the alcohol in the magnesium chloride solution.

In some embodiments of the process for preparing a solid pre-catalyst component, the internal electron donor is a carboxylic acids, carboxylic acid anhydrides, esters, ketones, or a combination of any two or more thereof. In some embodiments, of the process for preparing a solid pre-catalyst component, the internal electron donor is not an ether.

In some embodiments of the process for preparing a solid pre-catalyst component, the process further comprises washing the solid pre-catalyst component with a fourth solvent comprising a hydrocarbon or halogenated hydrocarbon.

In one aspect, provided herein is a solid pre-catalyst component prepared by the process comprising dissolving a magnesium chloride in a first solvent to form a magnesium chloride solution having a moisture level of about 100 to about 20,000 ppm water; contacting the magnesium chloride solution with a first titanium compound, optionally in a second solvent to form the solid pre-catalyst component; and treating the solid pre-catalyst component with a third solvent with or without a second titanium compound.

In one aspect, a process of polymerizing or copolymerizing an olefin is provided, the process comprising contacting the washed solid pre-catalyst component prepared by the process according to the methods above, with an organoaluminum activating agent and the olefin. In some embodiments, the organoaluminum activating agent is triethylaluminum. In further embodiments, the olefin is ethylene, propylene, 1-butylene, 1-methyl-1-pentene, 1-hexene, and 1-octene.

In one aspect, a catalyst system for use in olefinic polymerization is provided, the system comprising a solid pre-catalyst component produced by the process according to the methods above, an electron donor, and an organoaluminum compound. In some embodiments, the organoaluminum compound is an alkyl aluminum compound. In specific embodiments, the alkyl-aluminum compound is a trialkyl aluminum compound. In yet further embodiments, the trialkyl aluminum compound is triethylaluminum, triisobutylaluminum, or tri-n-octylaluminum.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e. CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

In one aspect, a process is provided for preparing a solid pre-catalyst component for use in olefin polymerization. The process includes dissolving a magnesium chloride in a first solvent to form a magnesium chloride solution having a moisture level of about 0.5 mmol water to about 100 mmol water per mol of $MgCl_2$; contacting the magnesium chloride solution with a first titanium compound, optionally in a second solvent to form the solid pre-catalyst component; and treating the solid pre-catalyst component with a third solvent with or without a second titanium compound. Generally speaking, the presence of a small amount of water in the magnesium chloride solution is critical to the catalyst performance. Molecules of water coordinate to magnesium atoms in alcohol solution providing an environment following the reaction with titanium halide and the precipitation of the solid magnesium chloride/titanium compound pre-catalyst. The amount of water corresponds to approximately the amount of active centers on the surface of the $MgCl_2$. Therefore, adding a specified amount of water to the $MgCl_2$ solution allows for control of the type and number of active sites of the catalyst, thereby controlling the performance of the catalyst.

In one aspect, the magnesium chloride solution is contacted with an internal electron donor along with or subsequent to dissolving the magnesium chloride. The contacting of the internal electron donor with the magnesium chloride solution may occur in different orderings. For example, the contacting of the magnesium chloride solution with the internal electron donor and the contacting the magnesium chloride solution with the first titanium compound in the second solvent to form the solid pre-catalyst component may occur simultaneously. In some embodiments, the contacting of the magnesium chloride solution with the internal electron donor and contacting the magnesium chloride solution with the first titanium compound in the second solvent to form the solid pre-catalyst component may occur sequentially. Accordingly, the first titanium compound may be contacted prior to or after the internal donor. In yet other embodiments, the contacting of the magnesium chloride solution with the internal electron donor occurs prior to contacting the solid with the auxiliary internal electron donor, or vice versa.

In some embodiments, the magnesium chloride solution or the solid pre-catalyst component may be further contacted with an auxiliary electron donor.

The titanium compounds used in the preparation of the solid pre-catalyst component may include, for example, a tetravalent titanium compound represented by Formula (I): $Ti(OR)_nX_{4-n}$ (I).

In Formula (I), R represents a hydrocarbon group, such as an alkyl group having 1 to about 20 carbon atoms, X represents a halogen atom, and $0 \leq g \leq 4$. Specific examples of the titanium compound include, but are not limited to, titanium tetrahalides such as $TiCl_4$, $TiBr_4$, and $TiI_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$, and $Ti(O-i-C_4H_9)Br_3$; dialkoxytitanium dihalides such as $Ti(OCH_3)_2Cl_2$, $Ti(OC_2H_5)_2Cl_2$, $Ti(O-n-C_4H_9)_2Cl_2$ and $Ti(OC_2H_5)_2Br_2$; trialkoxytitanium monohalides such as $Ti(OCH_3)_3Cl$, $Ti(OC_2H_5)_3Cl$, $Ti(O-n-C_4H_9)_3Cl$ and $Ti(OC_2H_5)_3Br$; and tetraalkoxytitaniums such as $Ti(OCH_3)_4$, $Ti(OC_2H_5)_4$ and $Ti(O-n-C_4H_9)_4$. In some embodiments, the halogen containing titanium compounds, such as titanium tetrahalides, are used. In specific embodiments, the first and second titanium compounds are titanium halides, such as $TiCl_4$.

The magnesium chloride may be anhydrous magnesium chloride or a hydrated magnesium chloride. Magnesium chloride is known to form different hydrates, $MgCl_2.12H_2O$, $MgCl_2.8H_2O$, $MgCl_2.6H_2O$, $MgCl_2.4H_2O$ and $MgCl_2.2H_2O$. In specific embodiments, $MgCl_2.6H_2O$ is used.

The magnesium chloride solution may be formed by dissolving a magnesium chloride hydrate in a first solvent has a first moisture level of about 100 to about 20,000 ppm water. In other embodiments, the moisture level of the magnesium chloride solution is adjusted by addition of water to the magnesium chloride solution to provide a magnesium chloride solution having moisture level of about 100 to about 20,000 ppm water. In some embodiments, the moisture level of the magnesium chloride solution is from about 1,000 to about 10,000 ppm water. In yet other embodiments, the moisture level of the magnesium chloride solution is from about 5,000 to about 10,000 ppm water.

The magnesium chloride solution may further include an aluminum alkoxide compound. In particular embodiments, the aluminum alkoxide compound is selected from the group consisting of aluminum methoxide, aluminum ethoxide, aluminum isopropoxide and mixtures thereof. In specific embodiments, the aluminum alkoxide compound is aluminum isopropoxide.

The alcohol compounds can include alcohols having between 2 and 12 carbon atoms. Exemplary alcohols include, but are not limited to, ethanol, 1-propanol, 2-propanol, 1-butanol, 2-butanol, 2-methyl-2-propanol, 1-pentanol, 2-pentanol, 1-hexanol, 1-heptanol, 1-octanol, 2-ethyl hexanol, and mixtures thereof.

In some embodiments, the first solvent, the second solvent, and the third solvent independently include a hydrocarbon or halogenated hydrocarbon solvent. In some embodiments, the hydrocarbon solvent is an aromatic or aliphatic hydrocarbon. Examples of aromatic hydrocarbons include, but are not limited to benzene, toluene, xylene, chlorobenzene, dichlorobenzene, trichlorobenzene, chlorotoluene, and derivatives thereof. Examples of aliphatic hydrocarbons include linear, branched, or cyclic alkanes having about 3 to about 30 carbons, such as butane, pentane, hexane, cyclohexane, heptanes, and the like. In particular embodiments, the first solvent, the second solvent, and the third solvent include hexane.

In some embodiments of the process described herein, the first and/or second solvent also include a siloxane solvent. Examples of siloxane solvent is dimethylpolysiloxane.

In some embodiments, the solid pre-catalyst component includes an internal electron donor. In some embodiments, the internal electron donor is a ester or a ketone, or a combination of any two or more thereof. In some embodiments, the internal electron donor is added to the magnesium chloride solution before, along with, or after contacting the magnesium chloride solution with a first titanium compound. In other additional or alternative embodiments, the internal electron donor is contacted with the solid pre-catalyst component prior to, along with, or after treating the solid pre-catalyst component with a third solvent.

Specific examples of monoesters include organic acid esters having 2 to about 30 carbon atoms such as methyl formate, butyl formate, ethyl acetate, vinyl acetate, propyl acetate, octyl acetate, cyclohexyl acetate, ethyl propionate, methyl butyrate, ethyl butyrate, isobutyl butyrate, ethyl valerate, ethyl stearate, methyl chloroacetate, ethyl dichloroacetate, ethyl acrylate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, ethyl p-methoxybenzoate, methyl p-methylbenzoate, ethyl p-t-butylbenzoate, ethyl naphthoate, methyl toluate, ethyl toluate, amyl toluate, ethyl ethylbenzoate, methyl anisate, ethyl anisate, and ethyl ethoxybenzoate. Additional examples of esters may include, but are not limited to, diethyl ethylmalonate, diethyl propylmalonate, diethyl isopropylmalonate, diethyl butylmalonate, diethyl 1,2-cyclohexanedicarboxylate, di-2-ethylhexyl 1,2-cyclohexanedicarboxylate, di-2-isononyl 1,2-cyclohexanedicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, diisononyl phthalate, di-2-ethylhexyl phthalate, diethyl succinate, dipropyl succinate, diisopropyl succinate, dibutyl succinate, diisobutyl succinate, dioctyl succinate, and diisononyl succinate. In addition mixtures of any two or more such esters may be used.

In some embodiments, the process does not include an ether internal electron donor.

In some embodiments of the process for preparing a solid pre-catalyst component, the magnesium chloride solution (also referred to herein as the "first solution") is further contacted with alkyl silicates. Examples of alkyl silicates include, but are not limited to, tetramethylorthosilicate, tetraethylorthosilicate, tetrapropylorthosilicate, tetrabutylorthosilicate, diethyidimethylorthosilicate, and the like, as well as mixtures of any two or more thereof.

In some embodiments, the magnesium chloride is dissolved in a first solvent to form a magnesium chloride solution at a temperature of from about 80° C. to about 150° C. In specific embodiments, the magnesium chloride is dissolved in a first solvent to form a magnesium chloride solution at a temperature of from about 110° C. to about 130° C. In some embodiments, the magnesium chloride is contacted with a first titanium compound at a temperature of from about −30° C. to about 50° C. In specific embodiments, the magnesium chloride is contacted with a first titanium compound, at a temperature of from about 20° C. to about 30° C. In some embodiments, the solid pre-catalyst component is treated with a third solvent with or without a second titanium compound at a temperature of from about 80° C. to about 150° C. In specific embodiments, the solid pre-catalyst component is treated with a third solvent with or without a second titanium compound at a temperature of from about 80° C. to about 100° C.

The solid pre-catalyst component may include additional compounds as surfactants, to enhance the properties of the solid pre-catalyst component.

In one embodiment, the solid pre-catalyst component contains from about 0.5 to about 6.0 wt % titanium; from about 10 to about 25 wt % magnesium; from about 40 to about 70 wt % halogen; from about 1 to about 50 wt % of at least one of the electron donor compounds of Formula (I);

and optionally inert diluent from about 0 to about 15 wt %. In another embodiment, the solid pre-catalyst component contains from about 2 to about 25 wt % of an internal electron donor. The solid pre-catalyst component may contain, in some embodiments, from about 2 wt % to about 25 wt % of a titanium alkoxide.

The amounts of the ingredients used in preparing the solid pre-catalyst component may vary depending upon the method of preparation. In one embodiment, from about 0.01 to about 5 moles of an internal electron donor and from about 0.01 to about 500 moles of the titanium compounds are used per mole of the magnesium chloride used to make the solid pre-catalyst component. In another embodiment, from about 0.05 to about 300 moles of the titanium compounds are used per mole of the magnesium compound used to make the solid pre-catalyst component.

In one embodiment, in the solid pre-catalyst component, the atomic ratio of halogen/titanium is from about 4 to about 200; the electron donor/titanium mole ratio is from about 0.01 to about 10; and the magnesium/titanium atomic ratio is from about 1 to about 100. In another embodiment, in the solid pre-catalyst component, the atomic ratio of halogen/titanium is from about 5 to about 100; the electron donor/titanium mole ratio is from about 0.2 to about 6; and the magnesium/titanium atomic ratio is from about 2 to about 50.

The solid pre-catalyst component may be used after being diluted with an inorganic or organic compound such as a silicon compound, an aluminum compound, or the like.

The catalyst system may contain at least one organoaluminum compound in addition to the solid pre-catalyst component. Compounds having at least one aluminum-carbon bond in the molecule may be used as the organoaluminum compound. Examples of organoaluminum compounds include compounds of the following chemical formula (II): $AlR_nX_{3-n}$ (II). In formula (II), R independently represents a hydrocarbon group usually having 1 to about 20 carbon atoms, X represents a halogen atoms, and n is greater than 0, up to, and including, 3.

Specific examples of the organoaluminum compounds represented by formula (II) include, but are not limited to, trialkyl aluminums such as triethyl aluminum, tributyl aluminum and trihexyl aluminum; trialkenyl aluminums such as triisoprenyl aluminum; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; alkyl aluminum dihalides such as ethyl aluminum dichloride, propyl aluminum dichloride and butyl aluminum dibromide; dialkyl aluminum hydrides such as diethyl aluminum hydride and dibutyl aluminum hydride; and other partially hydrogenated alkyl aluminum such as ethyl aluminum dihydride and propyl aluminum dihydride.

The organoaluminum compound is used in the catalyst system in an amount that the mole ratio of aluminum to titanium (from the solid pre-catalyst component) is from about 5 to about 1,000. In another embodiment, the mole ratio of aluminum to titanium in the catalyst system is from about 10 to about 700. In yet another embodiment, the mole ratio of aluminum to titanium in the catalyst system is from about 25 to about 400.

The catalyst system may contain at least one organosilicon compound in addition to the solid pre-catalyst component. This organosilicon compound is sometimes termed as an additional electron donor. The organosilicon compound as the additional electron donor may be an internal or external electron donor. The organosilicon compound contains silicon having at least one hydrocarbon group. General examples of hydrocarbon groups include alkyl groups, cycloalkyl groups, (cycloalkyl)methylene groups, alkene groups, aromatic groups, and the like.

The organosilicon compound, when used as an additional electron donor serving as one component of a Ziegler-Natta catalyst system for olefin polymerization, contributes to the ability to obtain a polymer (at least a portion of which is polyolefin) having a controllable molecular weight distribution and controllable crystallinity while retaining high performance with respect to catalytic activity.

The organosilicon compound is used in the catalyst system in an amount that the mole ratio of the organoaluminum compound to the organosilicon compound is from about 1 to about 200. In some embodiments, the mole ratio of the organoaluminum compound to the organosilicon compound is about 1 to about 100. In some embodiments, the mole ratio of the organoaluminum compound to the organosilicon compound is about 2 to about 90. In some embodiments, the mole ratio of the organoaluminum compound to the organosilicon compound is from about 5 to about 70. In some embodiments, the mole ratio of the organoaluminum compound to the organosilicon compound is about 1 to about 60. In yet another embodiment, the mole ratio of the organoaluminum compound to the organosilicon compound is from about 7 to about 35.

In one embodiment, the organosilicon compound is represented by chemical formula (III): $R_nSi(OR')_{4-n}$ (III) wherein each R and R' independently represent a hydrocarbon group, and n is from 0 to less than 4.

Specific examples of the organosilicon compound of formula (III) include, but are not limited to, trimethylmethoxysilane, trimethylethoxysilane, dimethyldimethoxysilane, dimethyldiethoxysilane, diisopropyldimethoxysilane, diisobutyldimethoxysilane, t-butylmethyldimethoxysilane, t-butylmethyldiethoxysilane, t-amylmethyldiethoxysilane, dicyclopentyldimethoxysilane, diphenyldimethoxysilane, phenylmethyldimethoxysilane, diphenyldiethoxysilane, bis-o-tolydimethoxysilane, bis-m-tolydimethoxysilane, bis-p-tolydimethoxysilane, bis-p-tolydiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, gamma-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, gamma-aminopropyltriethoxysilane, cholotriethoxysilane, ethyltriisopropoxysilane, vinyltirbutoxysilane, cyclohexyltrimethoxysilane, cyclohexyltriethoxysilane, 2-norbornanetrimethoxysilane, 2-norbornanetriethoxysilane, 2-norbornanemethyldimethoxysilane, ethyl silicate, butyl silicate, trimethylphenoxysilane, and methyltriallyloxysilane.

In another embodiment, the organosilicon compound is represented by chemical Formula (IV): $SiRR'_m(OR'')_{3-m}$ (IV). In Formula (IV), m is from 0 to less than 3, such as from 0 to about 2; and R independently represents a cyclic hydrocarbon or substituted cyclic hydrocarbon group. Illustrative examples of R include, but are not limited to, cyclopropyl; cyclobutyl; cyclopentyl; 2-methylcyclopentyl; 3-methylcyclopentyl; 2-ethylcyclopentyl; 3-propylcyclopentyl; 3-isopropylcyclopentyl; 3-butylcyclopentyl; 3-tertiary butyl cyclopentyl; 2,2-dimethylcyclopentyl; 2,3-dimethylcyclopentyl; 2,5-dimethylcyclopentyl; 2,2,5-trimethylcyclopentyl; 2,3,4,5-tetramethylcyclopentyl; 2,2,5,5-tetramethylcyclopentyl; 1-cyclopentylpropyl; 1-methyl-1-cyclopentylethyl; cyclopentenyl; 2-cyclopentenyl; 3-cyclopentenyl; 2-methyl-1-cyclopentenyl; 2-methyl-3-cyclopentenyl; 3-methyl-3-cyclopentenyl; 2-ethyl-3-cyclopentenyl; 2,2-dimethyl-3-cyclopentenyl; 2,5-dimethyl-3-cyclopentenyl; 2,3,4,5-tetramethyl-3-cyclopentenyl; 2,2,5,5-tetramethyl-3-cyclopentenyl; 1,3-cyclopentadienyl; 2,4-cyclopentadienyl; 1,4-cyclopentadienyl; 2-methyl-1,3-cyclopentadienyl; 2-methyl-2,4-cyclopentadienyl; 3-methyl-2,4-cyclopentadienyl; 2-ethyl-2,4-cyclopentadienyl; 2,2-dimethyl-2,4-cyclopentadienyl; 2,3-dimethyl-2,4-cyclopentadienyl; 2,5-dimethyl-2,4-cyclopentadienyl; 2,3,4,5-tetramethyl-2,4-cyclopentadienyl; indenyl; 2-methylindenyl; 2-ethylindenyl; 2-indenyl; 1-methyl-2-indenyl; 1,3-dimethyl-2-indenyl; indanyl; 2-methylindanyl; 2-indanyl; 1,3-dimethyl-2-indanyl; 4,5,6,7-tetrahydroindenyl; 4,5,6,7-tetrahydro-2-indenyl; 4,5,6,7-tetrahydro-1-methyl-2-indenyl; 4,5,6,7-tetrahydro-1,3-dimethyl-2-indenyl; fluorenyl groups; cyclohexyl; methylcyclohexyls; ethylcylcohexyls; propylcyclohexyls; isopropylcyclohexyls; n-butylcyclohexyls; tertiary-butyl cyclohexyls; dimethylcyclohexyls; and trimethylcyclohexyls.

In Formula (IV), R' and R" are identical or different and each represents a hydrocarbons. Examples of R' and R" are alkyl, cycloalkyl, aryl and aralkyl groups having 3 or more carbon atoms. Furthermore, R and R' may be bridged by an alkyl group, etc. General examples of organosilicon compounds are those of Formula (IV) in which R is cyclopentyl group, R' is an alkyl group such as methyl or cyclopentyl group, and R" is an alkyl group, particularly a methyl or ethyl group.

Specific examples of organosilicon compound of formula (IV) include, but are not limited to, trialkoxysilanes such as cyclopropyltrimethoxysilane, cyclobutyltrimethoxysilane, cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane and fluorenyltrimethoxysilane; dialkoxysilanes such as dicyclopentyldimethoxysilane, bis(2-methylcyclopentyl)dimethoxysilane, bis(3-tertiary butyl-cyclopentyl)dimethoxysilane, bis(2,3-dimethylcyclopentyl) dimethoxysilane, bis(2,5-dimethylcyclopentyl) dimethoxysilane, dicyclopentyldiethoxysilane, dicyclobutyldiethoxysilane, cyclopropylcyclobutyldiethoxysilane, dicyclopentenyldimethoxysilane, di(3-cyclopentenyl)dimethoxysilane, bis(2,5-dimethyl-3-cyclopentenyl)dimethoxysilane, di-2,4-cyclopentadienyl)dimethoxysilane, bis(2,5-dimethyl-2,4-cyclopentadienyl)dimethoxysilane, bis(1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane and indenylfiuorenyldimethoxysilane; monoalkoxysilanes such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentenadienylmethoxysilane and diindenylcyclopentylmethoxysilane; and ethylenebis-cyclopentyldimethoxysilane.

Polymerization of olefins may be carried out in the presence of the catalyst system described above. Generally speaking, olefins are contacted with the catalyst system described above under suitable conditions to form desired polymer products. In one embodiment, preliminary polymerization described below is carried out before the main polymerization. In another embodiment, polymerization is carried out without preliminary polymerization. In yet another embodiment, the formation of copolymer is carried out using at least two polymerization zones.

In preliminary polymerization, the solid pre-catalyst component is usually employed in combination with at least a portion of the organoaluminum compound. This may be carried out in the presence of part or the whole of the additional electron donor compound. The concentration of the catalyst system used in the preliminary polymerization may be much higher than that in the reaction system of the main polymerization.

In preliminary polymerization, the concentration of the solid pre-catalyst component in the preliminary polymerization is usually from about 0.01 to about 200 millimoles, preferably from about 0.05 to about 100 millimoles, calculated as titanium atoms per liter of an inert hydrocarbon medium described below. In one embodiment, the preliminary polymerization is carried out by adding an olefin and the above catalyst system ingredients to an inert hydrocarbon medium and polymerizing the olefin under mild conditions.

Specific examples of the inert hydrocarbon medium include, but are not limited to, mineral oil, petroleum jelly, aliphatic hydrocarbons such as propane, butane, pentane, hexane, heptanes, octane, decane, dodecane and kerosene; alicyclic hydrocarbons such as cyclopentane, cyclohexane and methylcyclopentane; aromatic hydrocarbons such as benzene, toluene and xylene; and mixtures thereof. A liquid olefin may be used in place of part or the whole of the inert hydrocarbon medium.

The olefin used in the preliminary polymerization may be the same as, or different from, an olefin to be used in the main polymerization.

The reaction temperature for the preliminary polymerization is sufficient for the resulting preliminary polymer to not substantially dissolve in the inert hydrocarbon medium. In one embodiment, the temperature is from about −20° C. to about 100° C. In another embodiment, the temperature is from about −10° C. to about 80° C. In yet another embodiment, the temperature is from about 0° C. to about 40° C.

Optionally, a molecular-weight controlling agent, such as hydrogen, may be used in the preliminary polymerization. The molecular weight controlling agent is used in such an amount that the polymer obtained by the preliminary polymerization has an intrinsic viscosity, measured in decalin at 135° C., of at least about 0.2 dl/g, and preferably from about 0.5 to 10 dl/g.

In one embodiment, the preliminary polymerization is desirably carried out so that from about 0.1 g to about 1,000 g of a polymer is formed per gram of the solid catalyst component of the catalyst system. In another embodiment, the preliminary polymerization is desirably carried out so that from about 0.3 g to about 500 g of a polymer is formed per gram of the solid catalyst component. If the amount of the polymer formed by the preliminary polymerization is too large, the efficiency of producing the olefin polymer in the main polymerization may sometimes decrease, and when the resulting olefin polymer is molded into a film or another article, fish eyes tend to occur in the molded article. The preliminary polymerization may be carried out batchwise or continuously.

After the preliminary polymerization conducted as above, or without performing any preliminary polymerization, the main polymerization of an olefin is carried out in the presence of the above-described olefin polymerization catalyst system formed from the solid pre-catalyst component, the organoaluminum compound and the organosilicon compound (external electron donor compound).

Examples of olefins that may be used in the main polymerization are α-olefins having 2 to 20 carbon atoms such as ethylene, propylene, 1-butene, 4-methyl-1-pentene, 1-pentene, 1-octene, 1-hexene, 1-octene, 3-methyl-1-pentene, 3-methyl-1-butene, 1-decene, 1-tetradecene, 1-eicosene, and vinylcyclohexane. In the process, these α-olefins may be used individually or in any combination. In some embodiments the olefin may be ethylene, propylene, or mixtures thereof. In some embodiments, the olefin may be ethylene. In some embodiments, the olefin may be propylene. In some embodiments, the olefin may be a mixture of ethylene with one or more of propylene, 1-butene, 4-methyl-1-pentene, 1-pentene, 1-octene, 1-hexene, 1-octene, 3-methyl-1-pentene, 3-methyl-1-butene, 1-decene, 1-tetradecene, 1-eicosene, and vinylcyclohexane.

In one embodiment, propylene or 1-butene is homopolymerized, or a mixed olefin containing propylene or 1-butene as a main component is copolymerized. When the mixed olefin is used, the proportion of propylene or 1-butene as the main component is usually at least about 50 mole %, preferably at least about 70 mole %.

By performing the preliminary polymerization, the catalyst system in the main polymerization may be adjusted in the degree of activity. This adjustment tends to result in a powdery polymer having a high bulk density. Furthermore, when the preliminary polymerization is carried out, the particle shape of the resulting polymer are replicas of the pre-catalyst particle morphology, and in the case of slurry polymerization, the slurry attains excellent characteristics while in the case of gas phase polymerization, the polymer seed bed attains excellent characteristics. Furthermore, in these embodiments, a polymer having a high stereoregularity index may be produced with a high catalytic efficiency by polymerizing an α-olefin having at least 3 carbon atoms. Accordingly, when producing the propylene copolymer, the resulting copolymer powder or the copolymer becomes easy to handle.

In the homopolymerization of these olefins, a polyunsaturated compound such as conjugated diene or non-conjugated diene may be used as a comonomer. Examples of comonomers include styrene, butadiene, acrylonitrile, acrylamide, α-methyl styrene, chlorostyrene, vinyl toluene, divinyl benzene, diallylphthalate, alkyl methacrylates and alkyl acrylates. In one embodiment, the comonomers include thermoplastic and elastomeric monomers.

The main polymerization of an olefin is carried out usually in the gaseous or liquid phase. In one embodiment, polymerization (main polymerization) employs a catalyst system containing the solid pre-catalyst component in an amount from about 0.001 to about 0.75 millimoles calculated as Ti atom per liter of the volume of the polymerization zone, the organoaluminum compound in an amount from about 1 to about 2,000 moles per mole of titanium atoms in the solid pre-catalyst component, and the organosilicon compound in an amount from about 0.001 to about 10 moles calculated as Si atoms in the organosilicon compound per mole of the metal atoms in the organoaluminum compound. In another embodiment, polymerization employs a catalyst system containing the solid pre-catalyst component in an amount of from 0.005 to about 0.5 millimoles calculated as Ti atom per liter of the volume of the polymerization zone, the organoaluminum compound in an amount from about 5 to about 500 moles per mole of titanium atoms in the solid pre-catalyst component, and the organosilicon compound in an amount from about 0.01 to about 2 moles calculated as Si atoms in the organosilicon compound per mole of the metal atoms in the organoaluminum compound. In yet another embodiment, polymerization employs a catalyst system containing the alkyl benzoate derivative in an amount from about 0.005 to about 1 mole calculated as Si atoms in the organosilicon compound per mole of the metal atoms in the organoaluminum compound.

When the organoaluminum compound and the additional electron donor compound are used partially in the preliminary polymerization, the catalyst system subjected to the preliminary polymerization is used together with the remainder of the catalyst system components. The catalyst system subjected to the preliminary polymerization may contain the preliminary polymerization product.

The use of hydrogen at the time of polymerization promotes and contributes to control of the molecular weight of the resulting polymer, and the polymer obtained may have a high melt flow rate. In this case, the stereoregularity index of the resulting polymer and the activity of the catalyst system are generally increased.

In one embodiment, the polymerization temperature is from about 20° C. to about 200° C. In another embodiment, the polymerization temperature is from about 50° C. to about 180° C. In one embodiment, the polymerization pressure is typically from atmospheric pressure to about 100 kg/cm$^2$. In another embodiment, the polymerization pressure is typically from about 2 kg/cm$^2$ to about 50 kg/cm$^2$. The main polymerization may be carried out batchwise, semi-continuously or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubber (EPR) such as ethylene propylene methylene copolymer rubber (EPM) and ethylene propylene diene methylene terpolymer rubber (EPDM).

The olefin polymer obtained by using the catalyst system has a very small amount of an amorphous polymer component and therefore a small amount of a hydrocarbon-soluble component. Accordingly, a film molded from the resultant polymer has low surface tackiness.

The polyolefin obtained by the polymerization process is excellent in particle size distribution, particle diameter and bulk density, and the copolyolefin obtained has a narrow composition distribution. In an impact copolymer, excellent fluidity, low temperature resistance, and a desired balance between stiffness and elasticity may be obtained.

In one embodiment, propylene and an α-olefin having 2 or from about 4 to about 20 carbon atoms are copolymerized in the presence of the catalyst system described above. The catalyst system may be one subjected to the preliminary polymerization described above. In another embodiment, propylene and an ethylene rubber are formed in two or more reactors coupled in series to form an impact polymer.

The α-olefin having 2 carbon atoms is ethylene, and examples of the α-olefin having about 4 to about 20 carbon atoms are 1-butene, 1-pentene, 4-methyl-1-pentene, 1-octene, 1-hexene, 3-methyl-1-pentene, 3-methyl-1-butene, 1-decene, vinylcyclohexane, 1-tetradecene, and the like.

In the main polymerization, propylene may be copolymerized with two or more such α-olefins. For example, it is possible to copolymerize propylene with ethylene and 1-butene. In one embodiment, propylene is copolymerized with ethylene, 1-butene or ethylene and 1-butene.

Block copolymerization of propylene and another α-olefin may be carried out in two stages. The polymerization in a first stage may be the homopolymerization of propylene or the copolymerization of propylene with the other α-olefin. In one embodiment, the amount of the monomers polymerized in the first stage is from about 50 to about 95% by weight. In another embodiment, the amount of the monomers polymerized in the first stage is from about 60 to about 90% by weight. This first stage polymerization may, as required be carried out in two or more stages under the same or different polymerization conditions.

In one embodiment, the polymerization in a second stage is desirably carried out such that the mole ratio of propylene to the other α-olefin(s) is from about 10/90 to about 90/10. In another embodiment, the polymerization in a second stage is desirably carried out such that the mole ratio of propylene to the other α-olefin(s) is from about 20/80 to about 80/20. In yet another embodiment, the polymerization in a second stage is desirably carried out such that the mole ratio of propylene to the other α-olefin(s) is from about 30/70 to about 70/30. Producing a crystalline polymer or copolymer of another α-olefin may be provided in the second polymerization stage.

The propylene copolymer so obtained may be a random copolymer or the above-described block copolymer. This propylene copolymer typically contains from about 7 to about 50 mole % of units derived from the α-olefin having 2 or from about 4 to about 20 carbon atoms. In one embodiment, a propylene random copolymer contains from about 7 to about 20 mole % of units derived from the α-olefin having 2 or from about 4 to about 20 carbon atoms. In another embodiment, the propylene block copolymer contains from about 10 to about 50 mole % of units derived from the α-olefin having 2 or 4-20 carbon atoms.

In another embodiment, copolymers made with the catalyst system contain from about 50% to about 99% by weight poly-α-olefins and from about 1% to about 50% by weight comonomers (such as thermoplastic or elastomeric monomers). In another embodiment, copolymers made with the catalyst system contain from about 75% to about 98% by weight poly-α-olefins and from about 2% to about 25% by weight comonomers.

It should be understood that where there is no reference to the polyunsaturated compound that may be used, the method of polymerization, the amount of the catalyst system and the polymerization conditions, the same description as the above embodiment are applicable.

The catalysts/methods may be in some instances lead to the production of homopolymerized poly-α-olefins having xylene soluble (XS) from about 0.5% to about 10%. In another embodiment, homopolymerized poly-α-olefins having xylene soluble (XS) from about 1.5% to about 8% are produced. In another embodiment, poly-α-olefins having xylene soluble (XS) from about 2.5% to about 5% are produced. XS refers to the percent of solid polymer that dissolves into xylene. A low XS % value generally corresponds to a highly isotactic homopolymer (i.e. higher crystallinity), whereas a high XS % value generally corresponds to a low isotactic polymer.

The present invention, thus generally described, will be understood more readily by reference to the following examples, which are provided by way of illustration and are not intended to be limiting of the present invention.

EXAMPLES

Example 1

$MgCl_2$ (12.0 g, Mesh 80, 5667 ppm of $H_2O$), 0.432 g Al(i-propoxide)$_3$, hexane (100 g), dimethylpolysiloxane (1.95 g) and 2-ethylhexanol (50 g), were heated at 120° C. with agitation for 6.0 hours. The solution was cooled to −25° C. and $TiCl_4$ (347 g) was added to the solution. The mixture was heated to 20° C. and further dimethylpolysiloxane (1.76 g) was added. The mixture was further heated to 90° C. and held at 90° C. for 1 hour. The liquid was filtered off and the remaining solids were treated with $TiCl_4$/hexane (152 g of $TiCl_4$ and 60 g of hexane) at 95° C. for 1 hour following by washing with hexane.

Ethylene polymerization was performed in a one-gallon reactor. The reactor was purged at 100° C. under nitrogen for one hour. At room temperature, 0.6 ml of 25-wt % triethylaluminum (TEAL) in heptane was added into the reactor. Then 1500 ml of hexane was added and 10 mg of the catalyst prepared above were added into the reactor. The reactor was pressurized with $H_2$ to 60.0 psig then charged with ethylene to 116 psig. The reactor was heated to and held at 80° C. for two hours. At the end of the hold, the reactor was vented and the polymer was recovered.

Example 2

The catalyst was synthesized under the same conditions as Example 1 except $MgCl_2$ containing 1868 ppm of $H_2O$ was added in the pre-catalyst synthesis. Ethylene polymerization was conducted under the same conditions as Example 1.

Example 3

The catalyst was synthesized under the same conditions as Example 1 except $H_2O$ (50 mg) was added into the solution before $TiCl_4$ was added the catalyst synthesis. Ethylene polymerization was conducted under the same condition as Example 1.

Example 4

The catalyst was synthesized under the same conditions as Example 3 except hexane was used in the catalyst synthesis. Ethylene polymerization was conducted under the same condition as Example 1.

Example 5

The catalyst was synthesized under the same conditions as Example 4 except $H_2O$ (30 mg) was added into the solution before $TiCl_4$ was added in the catalyst synthesis. Ethylene polymerization was conducted under the same condition as Example 1.

Characterization data for the catalysts of Examples 1-5 are presented in Table 1. Characterization data for the polymers of Examples 1-5 are presented in Table 2. $D_{10}$, $D_{50}$, and $D_{90}$ provide the range of the particle sizes of a given sample. FIGS. 1, 2A, 2B, 2C, and 2D provide charts of the prepared catalysts with respect to the Mg/Ti ratio (wt %).

TABLE 1

Characterization data for solid pre-catalyst component

| Example | $H_2O$, mmol/mol ppm | Hexane/$MgCl_2$ | $D_{10}$ | $D_{50}$ | $D_{90}$ | span | % Ti | % Mg | Al % | 2-Et-HexOH |
|---|---|---|---|---|---|---|---|---|---|---|
| 1 | 30.8 | 8.3 | 6.5 | 9.7 | 14.6 | 0.832 | 9.53 | 14.35 | 0.31 | 7.31 |
| 2 | 10.2 | 8.3 | 5.2 | 7.8 | 11.6 | 0.826 | 8.80 | 14.49 | 0.35 | 7.95 |
| 3 | 54.4 | 8.3 | N/A | N/A | N/A | N/A | 7.17 | 17.72 | 0.38 | 8.81 |
| 4 | 54.4 | 12.5 | 5.1 | 8.7 | 14.1 | 1.052 | 8.31 | 15.71 | 0.39 | 8.21 |
| 5 | 43.5 | 12.5 | 5.5 | 9.1 | 14.3 | 0.971 | 7.76 | 15.64 | 0.37 | 10.7 |

TABLE 2

Ethylene polymerization data

| CE/Kg/g | MFI2 g/10 min | MFI10 g/10 min | MFI22 g/10 min | MFI Ratio MFI22/MFI2 | BD cc/g | $D_{10}$ | $D_{50}$ | $D_{90}$ | span |
|---|---|---|---|---|---|---|---|---|---|
| 34.8 | 0.9 | 10.2 | 41.1 | 44.9 | 0.310 | 241 | 354 | 617 | 1.06 |
| 31.2 | 1.3 | 14.5 | 59.5 | 44.8 | 0.31 | 185 | 271 | 484 | 1.10 |
| 53.8 | 0.6 | 5.7 | 22.2 | 39.4 | 0.310 | 110 | 173 | 430 | 1.85 |
| 44.8 | 0.7 | 6.9 | 27.3 | 40.8 | 0.260 | 274 | 407 | 567 | 0.720 |
| 46.6 | 0.7 | 7.1 | 28.6 | 44.2 | 0.240 | 278 | 437 | 619 | 0.780 |

CE provides catalyst efficiency; MFI (melt flow index) is measured according to ASTM standard D1238; BD is the bulk density of the polymer.

The data in Tables 1 and 2 indicate that a solid pre-catalyst component as provided in the present technology is able to achieve high catalyst efficiency, good polymer properties.

Figure 1:
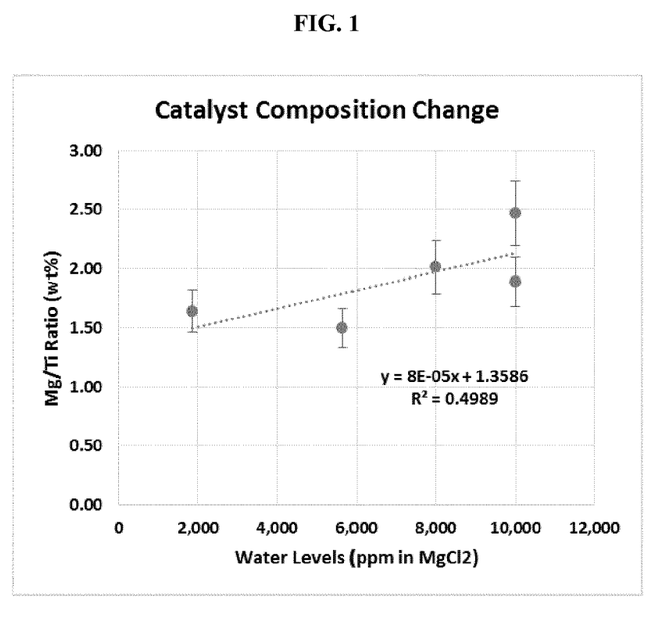
FIG. 1 provides a chart of the water levels of the magnesium chloride with respect to the Mg/Ti ratio (wt %), in accordance with the exemplary embodiments.
Figure 2A:
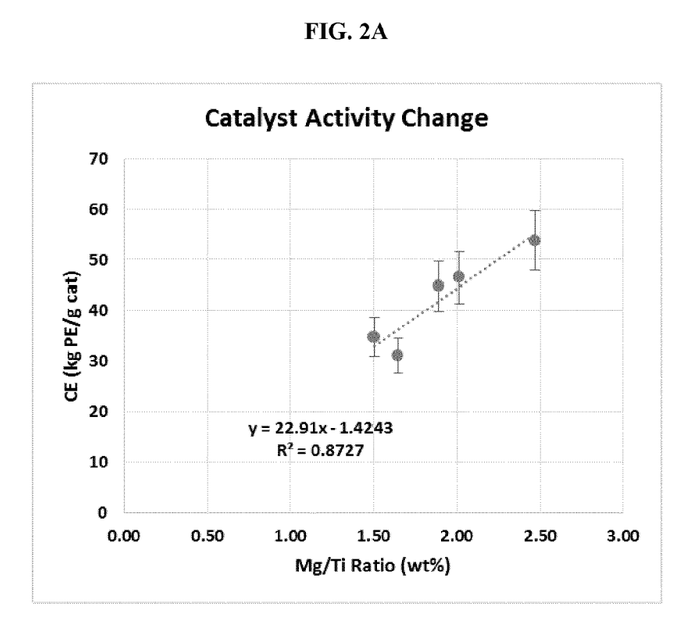
FIGS. 2A-2D provide charts of the catalyst activity change, melt flow index 10 change, melt flow index 22 change, and melt flow index ratio changes, respectively, in accordance with the exemplary embodiments.
Figure 2B:
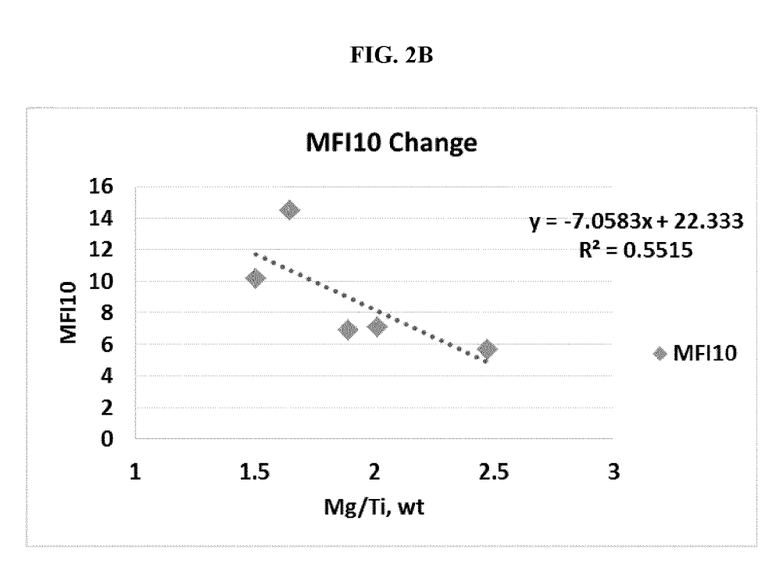
Figure 2C:
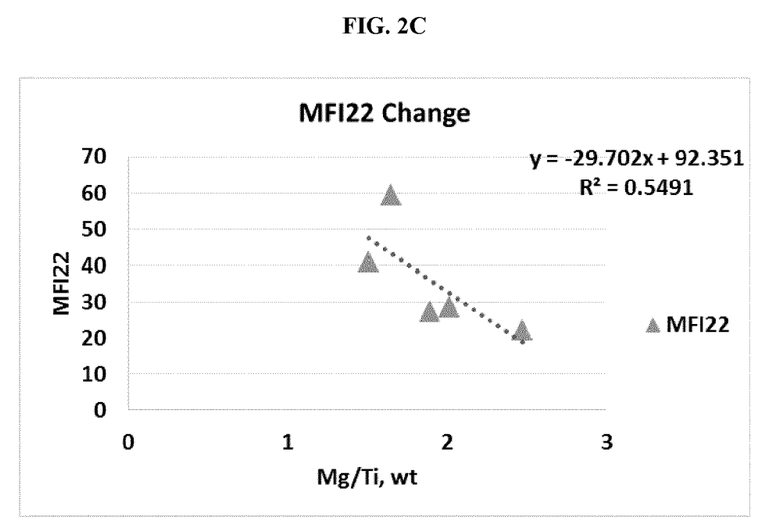
Figure 2D:
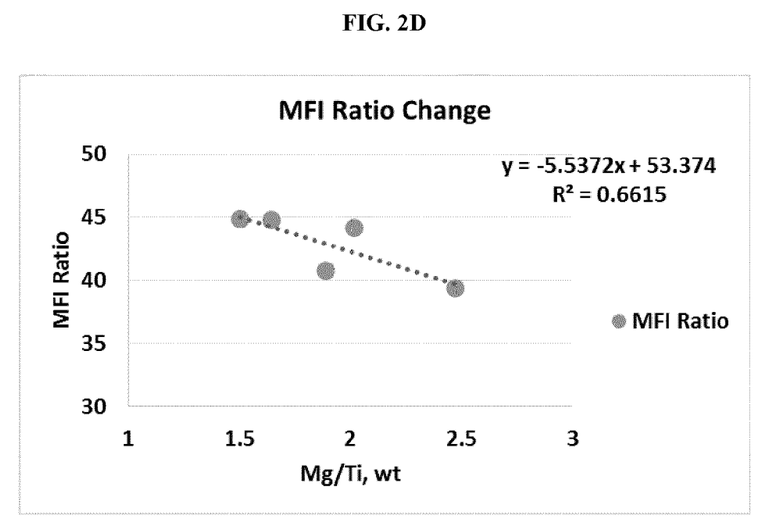

FIGS. 1 and 2 illustrate that the catalyst composition is changed with the amount of water in the $MgCl_2$ solution. The Mg/Ti ratio increases with increasing of the moisture level, and that imparts an effect on the polymerization behavior of the catalysts, in particular, increasing the catalyst activity and changing the MFI. It would also effect on the incorporation of a second monomer (e.g. butene-1).

Figure 3:
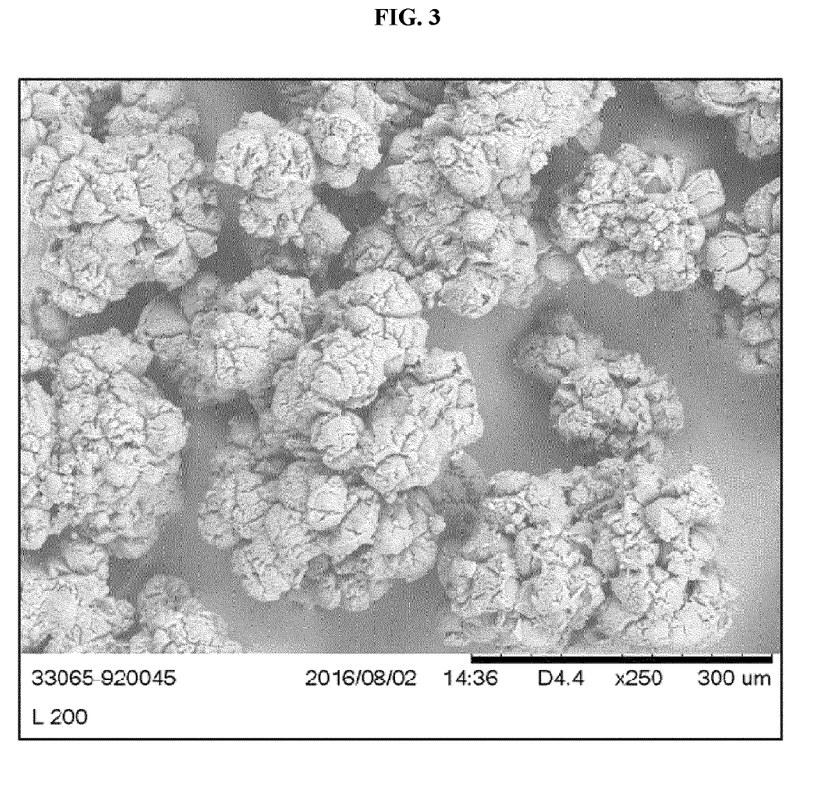
FIG. 3 provides an illustration of the polymer morphology made using MgCl$_2$ solution containing 1,868 ppm of water.
Figure 4:
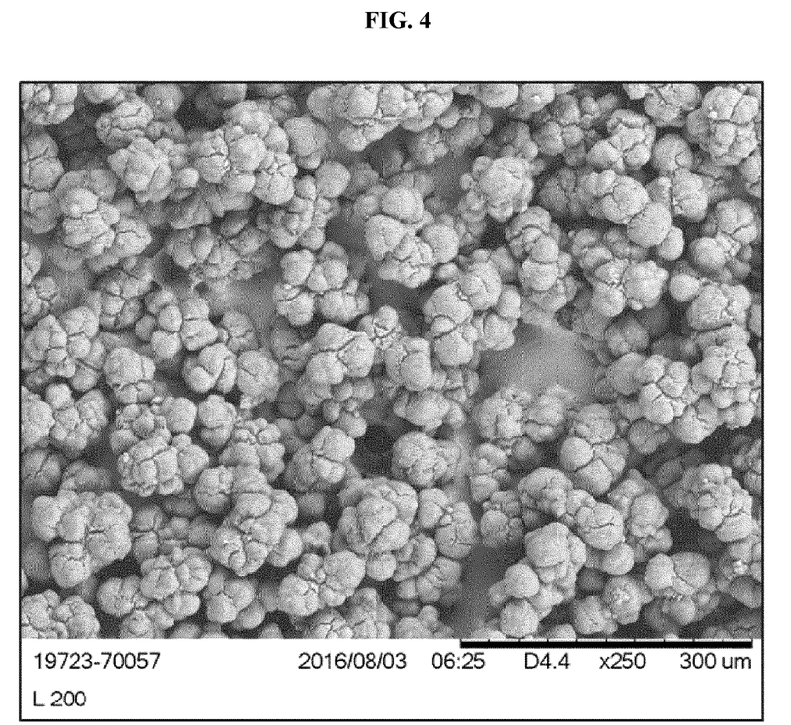
FIG. 4 provides an illustration of the polymer morphology made using MgCl$_2$ solution containing 10,000 ppm of water.

As seen in FIGS. 3 and 4, polymer morphology of the polymers prepared by the inventive catalysts is improved by increasing of moisture level in $MgCl_2$ solution. FIG. 3 represents the polymer morphology produced with catalyst prepared with 10.2 mmol of water per mol $MgCl_2$. The figure illustrates the agglomerated polymer particles without visible sub-particle structure. FIG. 4 shows the polymer particles produced with the catalyst which used 54.4 mmol of water per mol of $MgCl_2$. Single particles are shown having a very organized sub-particle structure. Because the polymer morphology is a replica of the catalyst morphology, the same trends in the catalyst morphology are expected. The catalyst and polymer morphology are key factors to consider in any commercial polymer production process. It is known that some polymerization processes require good flowability of the polymer, or transfer of the polymer from one reactor unit to another. Such properties may be better achieved with a polymer morphology like that in FIG. 4. The catalysts exhibiting a well-defined sub-particle structure may readily break down into the single particles during the polymerization process, thereby providing high catalyst activity and other specific polymerization features and benefits, such as high co-monomer incorporation.

Para. 1. A process for preparing a solid pre-catalyst component for use in olefinic polymerization, the process includes dissolving a magnesium chloride in an alcohol and optionally adding water to form a first solution having a water content of about 0.5 mmol water per mol $MgCl_2$ to about 100 mmol water per mol $MgCl_2$; contacting the first solution with a first titanium compound to form the solid pre-catalyst component; and treating the solid pre-catalyst component with a hydrocarbon or halogenated hydrocarbon solvent, optionally containing a second titanium compound.

Para. 2. The process of Para. 1 further comprising adding to the first solution a hydrocarbon, a siloxane, an aluminum alkoxide, or a mixture of any two or more thereof to form a second solution.

Para. 3. The process of Para. 1 or 2 further comprising adding to the first solution a hydrocarbon, a siloxane, and an aluminum alkoxide to form a second solution.

Para. 4. The process of Para. 1 with the proviso that no aluminum alkoxide compounds are present during the dissolving the magnesium chloride in the alcohol.

Para. 5. The process of any one of Paras. 1-4 further comprising contacting the first solution with an internal electron donor concurrently with, or subsequent to, dissolving the magnesium chloride in the alcohol.

Para. 6. The process of Para. 5, wherein contacting the first solution with the internal electron donor and contacting the first solution with the first titanium compound in the second solvent to form the solid pre-catalyst component occur simultaneously.

Para. 7. The process of Para. 5 or 6, wherein the internal donor is an organic monoester having 2 to about 30 carbon atoms.

Para. 8. The process according to any one of Paras. 2-7 further comprising contacting the first solution with an auxiliary electron donor.

Para. 9. The process according to any one of Paras. 2-8, wherein the aluminum alkoxide compound is added and is selected from the group consisting of aluminum methoxide, aluminum ethoxide, aluminum isopropoxide, and mixtures of any two or more thereof.

Para. 10. The process according to any one of Paras. 1-9, wherein the first titanium compound is a titanium halide, a titanium alkoxide, or a titanium alkoxychloride.

Para. 11. The process according to any one of Paras. 1-10, wherein the second titanium compound is a titanium halide.

Para. 12. The process according to any one of Paras. 1-11, wherein the magnesium chloride is hydrated magnesium chloride.

Para. 13. The process according to any one of Paras. 1-12, wherein the dissolving further comprises adjusting the moisture level of the first solution by adding water to the first solution.

Para. 14. The process according to any one of Paras. 1-3, wherein the moisture level of the magnesium chloride solution is from about 5 mmolH$_2$O/mol MgCl$_2$ to 50 mmol H$_2$O/mol MgCl$_2$.

Para. 15. The process according to Para. 13, wherein the moisture level of the magnesium chloride solution is from about 25 mmolH$_2$O/mol MgCl$_2$ to 50 mmol H$_2$O/mol MgCl$_2$.

Para. 16. The process according to Para. 2 or 3, wherein the hydrocarbon solvent is added and is an aromatic or aliphatic hydrocarbon.

Para. 17. The process according to Para. 16, wherein the hydrocarbon solvent is selected from the group consisting of toluene, ethyl benzene, pentane, hexane, and heptane.

Para. 18. The process according to Para. 2, wherein the siloxane is added.

Para. 19. The process according to Para. 3 or 17, wherein the siloxane is dimethylpolysiloxane.

Para. 20. The process according to any one of Paras. 5-19, wherein the internal electron donor is a carboxylic acid, carboxylic acid anhydride, ester, ketone, or a combination of any two or more thereof.

Para. 21. The process according to any one of Paras. 1-20, with the proviso that the internal electron donor is not an ether.

Para. 22. The solid pre-catalyst component prepared by the process of any one of Paras. 1-21.

Para. 23. A process of polymerizing or copolymerizing an olefin, the process comprising contacting the solid pre-catalyst component of Para. 22 with an organoaluminum activating agent and the olefin.

Para. 24. The process of Para. 23, wherein the organoaluminum activating agent is triethylaluminum, triisobutylaluminum, tri-n-octylaluminum, or a mixture of any two or more thereof.

Para. 25. The process of Para. 23 or 24, wherein the olefin is ethylene, propylene, 1-butylene, 1-methyl-1-pentene, 1-hexene, and 1-octene.

Para. 26. A catalyst system for use in olefinic polymerization, the system comprising the solid pre-catalyst component of Para. 22, an electron donor, and an organoaluminum compound.

Para. 27. A composition comprising magnesium chloride, an alcohol, and a titanium halide, wherein the composition is a pre-catalyst solution having a water content of about 0.5 mmol water per mol MgCl$_2$ to about 100 mmol water per mol MgCl$_2$.

Para. 28. The composition of Para. 27 further comprising a hydrocarbon, a siloxane, an aluminum alkoxide, or a mixture of any two or more thereof.

Para. 29. The composition of Para. 27 or 28 with the proviso that no alkylaluminum compounds are present during the dissolving the magnesium chloride in the alcohol.

Para. 30. The composition of Para. 27, 28, or 29 further comprising an internal electron donor and a titanium compound.

Para. 31. The composition of Para. 27, 28, 29, or 30, wherein the water content is from about 5 mmolH$_2$O/mol MgCl$_2$ to 50 mmol H$_2$O/mol MgCl$_2$.

Para. 32. The composition of Para. 31, wherein the water content is from about 25 mmolH$_2$O/mol MgCl$_2$ to 50 mmol H$_2$O/mol MgCl$_2$.

Para. 33. The composition of Para. 30, with the proviso that the internal electron donor is not an ether.

Para. 34. A polyolefin material prepared from a polyolefin catalyst composition comprising: a pre-catalyst composition comprising: magnesium chloride; an alcohol; and a titanium halide, wherein: the pre-catalyst composition was obtained from a pre-catalyst solution having a water content of about 0.5 mmol water per mol MgCl$_2$ to about 100 mmol water per mol MgCl$_2$; the polyolefin material is polyethylene; and the polyethylene exhibits a melt flow index of less than 40.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process for preparing a solid pre-catalyst component for use in olefinic polymerization, the process comprising:
   dissolving anhydrous magnesium chloride in an alcohol to form a complex of formula $[Mg(alcohol)_n]Cl_2$, where n is 2, 3, 4, 5, or 6; and
   adding water to form a first solution having a water content of about 0.5 mmol water per mol $MgCl_2$ to about 100 mmol water per mol $MgCl_2$;
   contacting the first solution with a first titanium compound to form the solid pre-catalyst component; and
   treating the solid pre-catalyst component with a hydrocarbon or halogenated hydrocarbon solvent, optionally containing a second titanium compound.

2. The process of claim 1 further comprising adding to the first solution a hydrocarbon, a siloxane, an aluminum alkoxide, or a mixture of any two or more thereof to form a second solution.

3. The process of claim 1 further comprising adding to the first solution a hydrocarbon, a siloxane, and an aluminum alkoxide to form a second solution.

4. The process of claim 1 with the proviso that no aluminum alkoxide compounds are present during the dissolving the magnesium chloride in the alcohol.

5. The process of claim 1 further comprising contacting the first solution with an internal electron donor concurrently with, or subsequent to, dissolving the magnesium chloride in the alcohol.

6. The process of claim 5, wherein contacting the first solution with the internal electron donor and contacting the first solution with the first titanium compound in the second solvent to form the solid pre-catalyst component occur simultaneously.

7. The process of claim 5, wherein the internal donor is an organic monoester having 2 to about 30 carbon atoms.

8. The process of claim 2, wherein the aluminum alkoxide compound is added and is selected from the group consisting of aluminum methoxide, aluminum ethoxide, aluminum isopropoxide, and mixtures of any two or more thereof.

9. The process of claim 1, wherein the first titanium compound is a titanium halide, a titanium alkoxide, or a titanium alkoxychloride.

10. The process of claim 1, wherein the second titanium compound is a titanium halide.

11. The process of claim 1, wherein the moisture level of the magnesium chloride solution is from about 5 mmol$H_2O$/mol $MgCl_2$ to 50 mmol $H_2O$/mol $MgCl_2$.

12. The process of claim 11, wherein the moisture level of the magnesium chloride solution is from about 25 mmol$H_2O$/mol $MgCl_2$ to 50 mmol $H_2O$/mol $MgCl_2$.

13. The process of claim 2, wherein the hydrocarbon solvent is added and is an aromatic or aliphatic hydrocarbon.

14. The process of claim 13, wherein the hydrocarbon solvent is selected from the group consisting of toluene, ethyl benzene, pentane, hexane, and heptane.

15. The process according to claim 2, wherein the siloxane is added.

16. The solid pre-catalyst component prepared by the process of claim 1.

17. A process of polymerizing or copolymerizing an olefin, the process comprising contacting the solid pre-catalyst component of claim 16 with an organoaluminum activating agent and the olefin.

18. The process of claim 17, wherein the organoaluminum activating agent is triethylaluminum, triisobutylaluminum, tri-n-octylaluminum, or a mixture of any two or more thereof.

19. The process of claim 18, wherein the olefin is ethylene, propylene, 1-butylene, 1-methyl-1-pentene, 1-hexene, and 1-octene.

* * * * *